United States Patent
Zaccano et al.

(10) Patent No.: US 11,484,050 B2
(45) Date of Patent: Nov. 1, 2022

(54) CRISPY PULSE PRODUCTS AND PROCESSES OF MAKING THE SAME

(71) Applicant: THE HERSHEY COMPANY, Hershey, PA (US)

(72) Inventors: Sue Zaccano, Harrisburg, PA (US); Krista Cessna, Hummelstown, PA (US)

(73) Assignee: THE HERSHEY COMPANY, Hershey, PA (US)

( * ) Notice: Subject to any disclaimer, the term of this patent is extended or adjusted under 35 U.S.C. 154(b) by 1119 days.

(21) Appl. No.: 16/077,200

(22) PCT Filed: Feb. 10, 2017

(86) PCT No.: PCT/US2017/017347
§ 371 (c)(1),
(2) Date: Aug. 10, 2018

(87) PCT Pub. No.: WO2017/139559
PCT Pub. Date: Aug. 17, 2017

(65) Prior Publication Data
US 2021/0186067 A1 Jun. 24, 2021

Related U.S. Application Data

(60) Provisional application No. 62/293,943, filed on Feb. 11, 2016.

(51) Int. Cl.
*A23L 5/10* (2016.01)
*A23L 11/00* (2021.01)

(52) U.S. Cl.
CPC ............... *A23L 5/13* (2016.08); *A23L 11/01* (2016.08)

(58) Field of Classification Search
CPC .................................. A23L 5/13; A23L 11/01
See application file for complete search history.

(56) References Cited

U.S. PATENT DOCUMENTS

| | | | |
|---|---|---|---|
| 3,637,400 A | 1/1972 | Mullen et al. | |
| 3,650,763 A | 3/1972 | Touba | |
| 3,680,473 A | 8/1972 | Bedenk et al. | |
| 3,869,556 A | 3/1975 | Rockland et al. | |
| 3,908,034 A | 9/1975 | Paugh | |

(Continued)

FOREIGN PATENT DOCUMENTS

| | | |
|---|---|---|
| AU | 2014221237 A1 | 9/2014 |
| CN | 101228941 A | 7/2008 |

(Continued)

OTHER PUBLICATIONS

International Search Report and Written Opinion for PCT/US2017/017347, dated May 17, 2017 12 pages.

*Primary Examiner* — Ericson M Lachica
(74) *Attorney, Agent, or Firm* — McNees Wallace & Nurick LLC (57) ABSTRACT

A process of producing crispy pulses includes hydrating a plurality of raw pulses including cooking to produce hydrated pulses having a predetermined hydrated texture and a predetermined hydrated moisture content and crisping the hydrated pulses to produce the crispy pulses having a crispy texture and a predetermined final moisture content. A crispy pulse formed from a raw pulse has a predetermined crispy texture profile and a crispy texture.

16 Claims, 2 Drawing Sheets

(56) References Cited

U.S. PATENT DOCUMENTS

| | | | |
|---|---|---|---|
| 3,958,032 A | 5/1976 | Merriam | |
| 3,978,244 A | 8/1976 | Sair | |
| 4,517,204 A | 5/1985 | Mottur et al. | |
| 4,734,289 A | 3/1988 | Yamaguchi et al. | |
| 4,769,249 A | 9/1988 | Webb | |
| 4,844,931 A | 7/1989 | Webb | |
| 4,876,099 A | 10/1989 | MacGregor et al. | |
| 4,946,697 A | 8/1990 | Payne | |
| 4,950,492 A | 8/1990 | Shachat et al. | |
| 5,108,772 A | 4/1992 | Wilbur | |
| 5,183,678 A | 2/1993 | Taga et al. | |
| 5,747,080 A | 5/1998 | Lemke et al. | |
| 5,871,801 A | 2/1999 | Kazemzadeh | |
| 5,902,629 A | 5/1999 | Baker et al. | |
| 6,040,503 A | 3/2000 | Ehlers et al. | |
| 6,042,860 A | 3/2000 | Bichsel | |
| 6,048,561 A | 4/2000 | Ohtake et al. | |
| 6,090,433 A | 7/2000 | Sterner et al. | |
| 6,171,631 B1 | 1/2001 | Willoughby et al. | |
| 6,299,922 B1 | 10/2001 | Bichsel | |
| 6,461,660 B2 | 10/2002 | Morii et al. | |
| 6,602,534 B1* | 8/2003 | Rose | A23L 11/31 426/507 |
| 6,645,541 B2 | 11/2003 | Morii et al. | |
| 6,716,462 B2 | 4/2004 | Prosise et al. | |
| 6,720,015 B2 | 4/2004 | Prosise et al. | |
| 6,726,943 B2 | 4/2004 | Prosise et al. | |
| 6,805,888 B2 | 10/2004 | Wu | |
| 6,827,954 B2 | 12/2004 | Prosise et al. | |
| 6,846,501 B2 | 1/2005 | Prosise et al. | |
| 6,929,813 B2 | 8/2005 | Malfait | |
| 7,235,276 B2 | 6/2007 | Allen et al. | |
| 7,297,357 B2 | 11/2007 | Akimoto et al. | |
| 7,556,836 B2 | 7/2009 | Mueller et al. | |
| 7,648,352 B2 | 1/2010 | Morales-Alvarez et al. | |
| 7,871,657 B2 | 1/2011 | Nagappa et al. | |
| 8,158,179 B2 | 4/2012 | Bouvier et al. | |
| 8,293,317 B2 | 10/2012 | Fannon et al. | |
| 8,741,370 B2 | 6/2014 | Ganjyal et al. | |
| 8,778,442 B2 | 7/2014 | Khan et al. | |
| 8,794,129 B2 | 8/2014 | Cretors | |
| 2002/0187242 A1* | 12/2002 | Stubbs | A23L 29/212 426/634 |
| 2003/0034145 A1 | 2/2003 | Ishiduka et al. | |
| 2004/0191397 A1 | 9/2004 | Bhattacharya et al. | |
| 2006/0019009 A1 | 1/2006 | Keller et al. | |
| 2006/0153965 A1* | 7/2006 | Borders | A23L 11/05 426/634 |
| 2007/0077345 A1 | 4/2007 | Borders et al. | |
| 2007/0092616 A1 | 4/2007 | Witte et al. | |
| 2007/0243301 A1 | 10/2007 | Barnett et al. | |
| 2008/0145483 A1 | 6/2008 | Berrios et al. | |
| 2008/0248180 A1 | 10/2008 | Barnett et al. | |
| 2008/0280020 A1 | 11/2008 | Kugitani et al. | |
| 2010/0034926 A1 | 2/2010 | Frick et al. | |
| 2010/0285196 A1 | 11/2010 | Moore et al. | |
| 2011/0274741 A1 | 11/2011 | Horton | |
| 2012/0064209 A1 | 3/2012 | Ardisson-Korat et al. | |
| 2012/0156352 A1 | 6/2012 | Moore et al. | |
| 2012/0315359 A1 | 12/2012 | Gandhi et al. | |
| 2013/0022732 A1 | 1/2013 | Khan et al. | |
| 2013/0071491 A1 | 3/2013 | Berrios et al. | |
| 2013/0164429 A1 | 6/2013 | Stromotich et al. | |
| 2015/0289546 A1 | 10/2015 | Miya et al. | |
| 2015/0296836 A1 | 10/2015 | Fleckenstein | |
| 2018/0242629 A1* | 8/2018 | Watterson | A23G 3/50 |

FOREIGN PATENT DOCUMENTS

| | | |
|---|---|---|
| CN | 101756113 A | 6/2010 |
| CN | 101828682 A | 9/2010 |
| CN | 102488059 A | 6/2012 |
| CN | 102669232 A | 9/2012 |
| CN | 102669576 A | 9/2012 |
| CN | 202552053 U | 11/2012 |
| CN | 102987270 A | 3/2013 |
| CN | 103125857 A | 6/2013 |
| CN | 103250999 A | 8/2013 |
| CN | 103300299 A | 9/2013 |
| CN | 103300300 A | 9/2013 |
| CN | 103380845 A | 11/2013 |
| CN | 103461888 A | 12/2013 |
| CN | 103478610 A | 1/2014 |
| CN | 103960651 A | 8/2014 |
| CN | 104171977 A | 12/2014 |
| DE | 19521168 A1 | 12/1996 |
| EP | 0937414 A2 | 8/1999 |
| JP | 2004121067 A | 4/2004 |
| JP | 2010130958 A | 6/2010 |
| RO | 127798 A2 | 9/2012 |
| RU | 2495608 C1 | 10/2013 |
| WO | 9402032 A1 | 2/1994 |
| WO | 03077670 A1 | 9/2003 |
| WO | 2007132014 A2 | 11/2007 |
| WO | 2013072387 A2 | 5/2013 |
| WO | 2014069383 A1 | 5/2014 |
| WO | 2014084422 A1 | 6/2014 |
| WO | 2015099665 A2 | 7/2015 |
| WO | 20160176736 A1 | 11/2016 |

* cited by examiner

CRISPY PULSE PRODUCTS AND PROCESSES OF MAKING THE SAME

CROSS-REFERENCE TO RELATED APPLICATIONS

This application claims priority to and the benefit of U.S. Provisional Application No. 62/293,943 filed Feb. 11, 2016, which is hereby incorporated by reference in its entirety.

FIELD OF THE INVENTION

This application is directed to crispy edible products and processes of making the same. More particularly, the present invention is directed to food products including crispy pulses and processes of making the same.

BACKGROUND OF THE INVENTION

Food products with a light and airy texture have been obtained by extrusion technology, where starches are expanded or puffed as they come out of a die, by puffing gun technology, or by frying. Drawbacks of extrusion technology and puffing gun technology include a high capital expenditure and limited product formats. A drawback of frying is that the product is typically calorie-laden with a higher-than-desired fat content. Conventional baking is only able to provide a light and airy texture to certain foods.

A crisping mechanism for traditional grains, such as rice and popcorn, is to temper the material to a low moisture to control steam explosion within the structure and obtain the final desired texture.

Typically, a bean that is soaked and/or insufficiently cooked and then dried has a hard and glassy texture, which is not preferred by consumers, when eaten and is normally not eaten in this form.

It would be desirable to provide a crispy food product that is from a natural source, that is healthy, that is shelf-stable, and that is easily and inexpensively produced.

BRIEF DESCRIPTION OF THE INVENTION

Exemplary embodiments are directed to healthy, tasty, crispy food products from pulses and to processes of making a healthy, tasty, crispy food product from pulses without the use of extrusion technology or frying.

Exemplary embodiments employ control of moisture content, temperature, cooking time, and cooking pressure to cook pulses under high moisture conditions that are then dried to a crispy texture.

Among the advantages of exemplary embodiments is that a crispy pulse is produced from inexpensive ingredients, without expensive equipment, such as extrusion equipment, and without compromising the nutritional level relative to the raw pulse, from which the crispy pulse is produced, such as occurs by frying.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF EXEMPLARY EMBODIMENTS

In an embodiment, a process of producing crispy pulses includes hydrating a plurality of raw pulses to produce hydrated pulses having a predetermined hydrated texture and a predetermined hydrated moisture content and crisping the hydrated pulses to produce the crispy pulses having a crispy texture and a predetermined final moisture content. The hydrating includes cooking.

In another embodiment, a crispy pulse formed from a raw pulse has a predetermined crispy texture profile and a crispy texture.

A pulse food product is preferably shelf-stable, light, and crispy. A crispy pulse is preferably produced by starting with a raw pulse, raising the moisture content of the pulse with respect to its raw form, and exposing the pulse to predetermined temperatures for a predetermined time to sufficiently modify the internal structure of the pulse before it is crisped and expanded in standard ovens or dryers. If the moisture content is too high and the heat is applied for too long of a period of time during the hydrating, the starch leaches out of the pulse and a sticky residue is left in the crisping device or the pulse loses its shape and becomes crushed. If the pulse is never exposed to temperatures above the gelatinization temperature of the pulse starch and is not allowed enough time to absorb sufficient water, or if insufficient heat is applied, then the pulse has a harder, crunchier texture or a large hollow center after crisping.

Crispy, as used herein, refers to the quality of a food product readily breaking or fracturing rather than deforming, when the product is chewed with the molar teeth, characterized by many small breaks in the food product accompanied by a quieter, shorter, relatively higher-pitched sound.

Crunchy, as used herein, refers to the quality of a food product readily breaking or fracturing rather than deforming, when the product is chewed with the molar teeth, characterized by fewer, larger breaks in the food product accompanied by a louder, longer, sharper, relatively lower-pitched sound.

Soaking, as used herein, refers to hydrating a pulse at a temperature below the starch gelatinization temperature of the pulse.

Cooking, as used herein, refers to hydrating a pulse at a temperature above the starch gelatinization temperature of the pulse. The cooking may be a batch process or a continuous process.

Quick cooling, as used herein, refers to reducing the temperature of a cooking pulse with a cooling fluid to quickly stop the cooking process.

Crisping, as used herein, refers to heating a hydrated pulse under predetermined crisping conditions including a predetermined crisping time and a predetermined crisping temperature to dry the hydrated pulse to a predetermined moisture content and, if the hydrated pulse was appropriately cooked to a predetermined hydrated texture and a predetermined hydrated moisture content, to form a crispy pulse. If the crisping is performed on an uncooked or undercooked hydrated pulse, the pulse product does not have a crispy texture but may have a crunchy texture instead.

Starch gelatinization temperature, as used herein, refers to the minimum temperature required to break down intermolecular bonds of starch molecules in the presence of water.

A pulse, as used herein, refers to any dried edible seed of a leguminous plant. Pulses are typically high in protein, high in fiber, and very low in fat and are often stored in a dried state. Examples of pulses include, but are not limited to, kidney beans, navy beans, pinto beans, lima beans, azuki beans, mung beans, mungo beans, scarlet runner beans, rice beans, moth beans, Tepary beans, horse beans, broad beans, field beans, black beans, yellow whole peas, garden peas, chickpeas, cowpeas, pigeon peas, lentils, earth peas, vetches, lupins, hyacinth beans, jack beans, winged beans, velvet beans, yam beans, and combinations thereof. Although primarily described herein with respect to pulses, it will be appreciated that soy beans, peanuts, and other such non-pulse legumes may be employed in some embodiments.

Different pulses may have different starch gelatinization temperatures depending on the starch composition of the different pulses. In some embodiments, the starch gelatinization temperature is in the range of about 131° F. to about 185° F. (about 55° C. to about 85° C.), alternatively in the range of about 140° F. to about 176° F. (about 60° C. to about 80° C.), alternatively in the range of about 149° F. to about 167° F. (about 65° C. to about 75° C.), alternatively in the range of about 131° F. to about 140° F. (about 55° C. to about 60° C.), alternatively in the range of about 140° F. to about 149° F. (about 60° C. to about 65° C.), alternatively in the range of about 149° F. to about 158° F. (about 65° C. to about 70° C.), alternatively in the range of about 158° F. to about 167° F. (about 70° C. to about 75° C.), alternatively in the range of about 167° F. to about 176° F. (about 75° C. to about 80° C.), alternatively in the range of about 176° F. to about 185° F. (about 80° C. to about 85° C.), or any range or sub-range therebetween.

Control of the moisture content, temperature, cooking time, and cooking pressure while hydrating pulses under high moisture conditions followed by crisping produces a dried pulse that may have a crunchy texture or a crispy texture. If the moisture content is too high and the heat is applied for too long of a time, the interconnection between the starch granules breaks down and the starch leaches out of the pulse, leaving a sticky residue on the crisping device or causing the pulse to lose its shape and become crushed.

Figure 1:
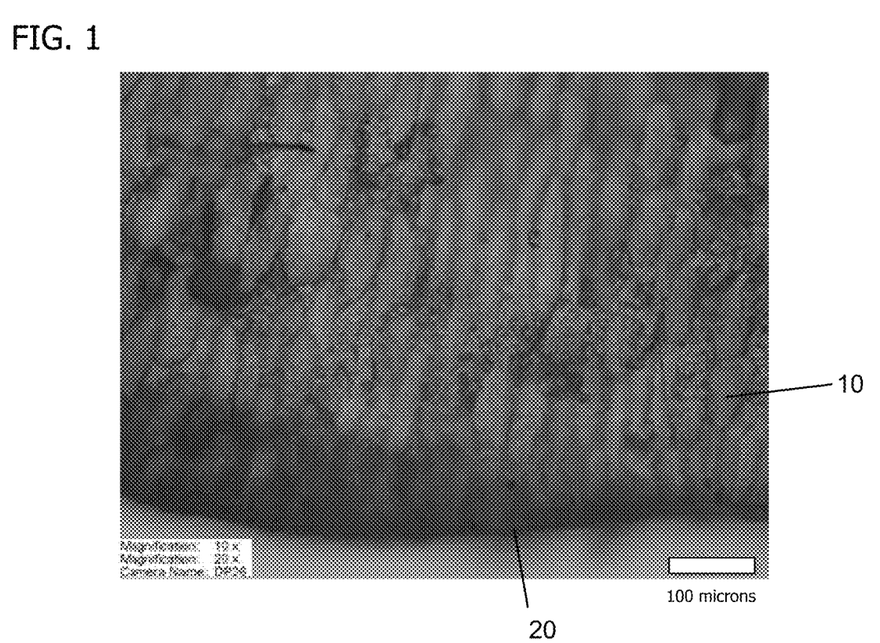
FIG. 1 is a micrographic image of starch granules in a hydrated pulse that has been insufficiently cooked and is dryable to a crunchy texture.

Referring to FIG. 1, the pulse has been cooked under conditions sufficient to gelatinize the starch but the starch granules 10 are still perpendicular to the cell wall 20 and tightly packed. The pulse has been insufficiently cooked and does not become a crispy pulse upon drying under crisping conditions. This product, when dried, delivered a harder, crunchy texture.

Figure 2:
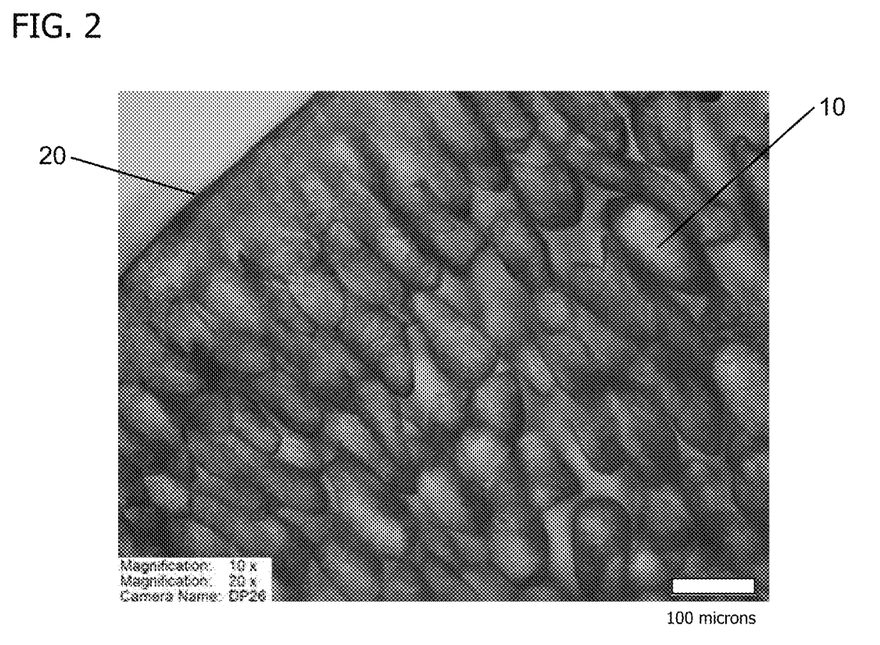
FIG. 2 is a micrographic image of starch granules in a hydrated pulse that has been cooked appropriately to be dryable to a crispy texture.

Referring to FIG. 2, the pulse has been cooked to the point at which the starch granules 10 are still substantially interconnected but exhibit swelling and some separation as the interconnection has begun to break down. The starch granules 10 are more loosely packed than in FIG. 1, and the resultant product, when dried, was crispy in texture. The pulse has been appropriately cooked and becomes a crispy pulse upon drying under crisping conditions.

Figure 3:
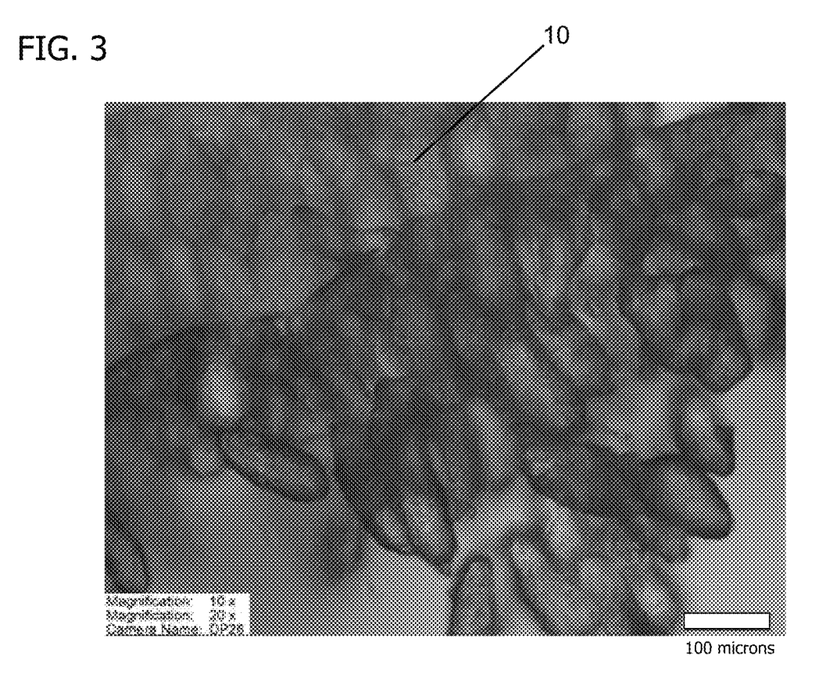
FIG. 3 is a micrographic image of starch granules in a hydrated pulse that has been cooked too long to be dryable to a friable or a fragile texture.

Referring to FIG. 3, the pulse has been cooked too long and does not become a crunchy or a crispy pulse upon drying under crisping conditions. The interconnection between the starch granules 10 has broken down and the resultant dried product was neither crunchy nor crispy and left a sticky starch residue on the crisping device.

Figure 4:
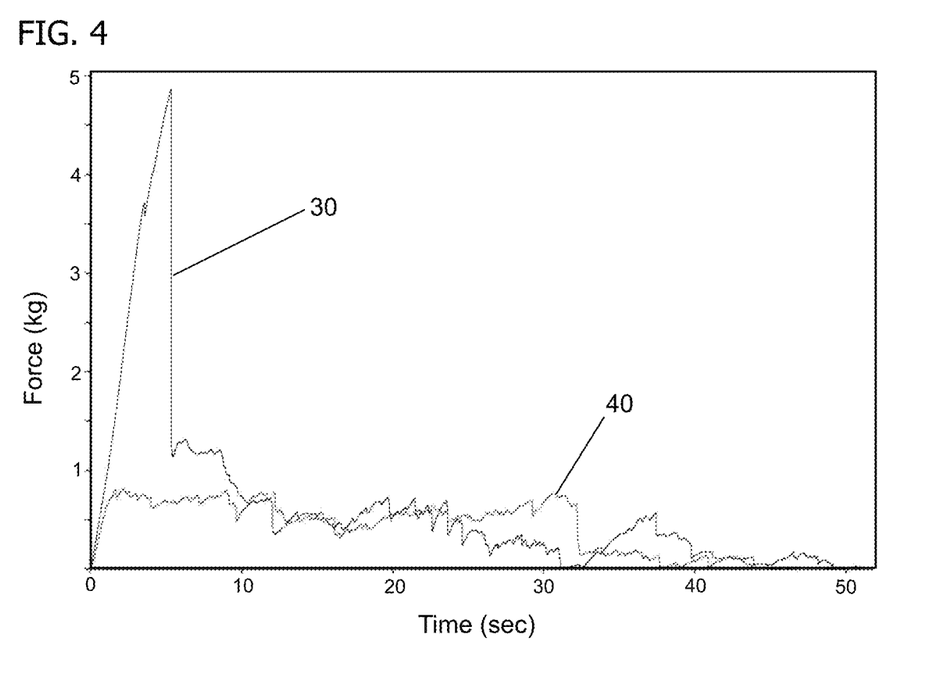
FIG. 4 is a graph of texture profiles of a crunchy chickpea and a crispy chickpea.

Referring to FIG. 4, texturometer tests show the difference in texture profile for crunchy chickpeas that have been hydrated by soaking but without cooking followed by crisping and crispy chickpeas that have been hydrated by cooking to the stage shown in FIG. 2 followed by crisping. In the texturometer, the sample is placed between two plates which approach each other at a constant rate while the force on the plates by the sample is measured. The crunchy chickpea texture profile 30 reaches a maximum force of about 4.8 kg before the force drops to almost 1 kg around 5 seconds as a result of a catastrophic large break and collapse of the crunchy chickpea. This crunchy chickpea texture profile 30 is characteristic of a hard, crunchy profile. In contrast, the crispy chickpea texture profile 40 reaches a maximum force of about 0.8 kg and shows mostly only small alternating decreases and increases in force, indicative of small breaks of the crispy chickpea, upon further squeezing of the crispy chickpea.

Similarly, other crispy pulses formed by the process disclosed herein also have a much lower maximum force and no sharp drop in force in contrast to uncooked or insufficiently-cooked crunchy versions of the same pulses.

The center of a crispy pulse formed by the process disclosed tends to have a different center appearance in comparison to an uncooked or insufficiently-cooked crunchy version of the same pulse. The center of an uncooked or insufficiently-cooked crunchy pulse typically has a large empty space or hollow, with much or all of the starch material being attached to the outer wall of the pulse. The center may also be glassy in appearance. In contrast, the center of a crispy pulse formed by the process disclosed herein tends to have a much more uniform, although porous, center that tends to be powdery in appearance.

In some embodiments, the process produces a crispy pulse from a dry, raw pulse. The process includes processing the dry, raw pulses to produce a hydrated pulse having a predetermined hydrated texture and a predetermined hydrated moisture content and processing the hydrated pulse to produce a crispy pulse having a crispy texture and a predetermined final moisture content.

The predetermined hydrated texture and the predetermined hydrated moisture content reflect a proper starch gelatinization condition of the hydrated pulse where starch granules are still substantially interconnected while exhibiting swelling and some separation. This condition is achieved by heating the pulse in water to a controlled temperature above the starch gelatinization for a controlled amount of time. Prior to heating, the pulse may optionally be soaked in water for a predetermined amount of time or until a predetermined moisture content is reached. The soaking may occur at an ambient temperature in the range of about 40° F. to about 90° F. (about 4° C. to about 32° C.), alternatively about 50° F. to about 70° F. (about 10° C. to about 21° C.). The heating may occur in one or more stages in water, in a continuous or batch process, under atmospheric pressure or a controlled higher pressure, under controlled temperature, or for a controlled period of time until the predetermined hydrated texture and the predetermined hydrated moisture content is reached. The cooking temperature may be in the range of about 180° F. to about 250° F. (about 82° C. to about 121° C.), alternatively about 196° F. to about 204° F. (about 91° C. to about 94° C.). The pulse is then cooled quickly to maintain that predetermined hydrated texture.

The crispy texture and predetermined final moisture content are achieved by crisping the hydrated pulse. The crisping includes heating and drying the hydrated pulse. The crisping may occur in one or more stages, in a continuous or batch process, under atmospheric pressure or a controlled higher pressure, under controlled temperature, under controlled humidity, or under controlled airflow until the predetermined hydrated texture and the predetermined hydrated moisture content. The crisping temperature may be in the range of about 265° F. to about 490° F. (about 129° C. to about 254° C.), alternatively about 275° F. to about 350° F. (about 135° C. to about 177° C.). Crispy pulses having a crispy texture may have a range of appearances and a range of flavors depending on the selected crisping conditions. The crisping conditions may be selected to achieve a desired appearance or a desired flavor.

The crispy pulse has a crispy texture. The predetermined final moisture content of the crispy pulse may be about 8% or less or about 4% or less, by weight. The crispy pulse may have a density of about 450 g/L or less, alternatively a density in the range of about 350 g/L to about 450 g/L, alternatively a density of about 53% or less of the density of the dry, raw pulse, or alternatively a density in the range of about 47% to about 53% of the density of the dry, raw pulse.

In some embodiments, the pulse is a lentil and the process produces a crispy lentil. A dry, raw lentil is soaked for about 90 minutes in water at a temperature of about 70° F. (about 21° C.) or less or to a moisture content of about 50% to about 60%, by weight, preferably about 50% to about 55%. The soaked lentil is cooked in water at about 196° F. to about 204° F. (about 91° C. to about 96° C.) for about 24 minutes to about 28 minutes, or to a moisture content of about 60% to about 70%, by weight, preferably about 63% to about 68%. The hydrated lentil is then quick-cooled in water at a temperature of about 40° F. to about 50° F. (about 5° C. to about 10° C.). The cooled lentil is then crisped to a crispy lentil by drying at a temperature of about 275° F. to about 350° F. (about 135° C. to about 177° C.), such as about 320° F. to about 325° F. (about 160° C. to about 163° C.), for about 10 minutes to about 24 minutes, such as about 15 minutes to about 18 minutes, or to a moisture content of about 4% or less, by weight.

In some embodiments, the pulse is a chickpea and the process produces a crispy chickpea. A dry, raw chickpea is soaked for about 8 hours to about 15 hours in water at a temperature of about 70° F. (about 21° C.) or less or to a moisture content of about 50% to about 60%, by weight, preferably about 52% to about 56%. The soaked chickpea is cooked in water at about 196° F. to about 204° F. (about 91° C. to about 96° C.) for about 90 minutes to about 120 minutes, or to a moisture content of about 60% to about 70%, by weight, preferably about 62% to about 66%. The hydrated chickpea is then quick-cooled in water at a temperature of about 40° F. to about 50° F. (about 5° C. to about 10° C.) for about 5 minutes. The cooled chickpea is then crisped to a crispy chickpea by drying at a temperature of about 275° F. to about 350° F. (about 135° C. to about 177° C.), such as about 320° F. to about 350° F. (about 160° C. to about 177° C.), for about 20 minutes to about 40 minutes, such as about 20 minutes to about 25 minutes, or to a moisture content of about 8% or less or about 4% or less, by weight. Alternatively, the cooled chickpea is crisped by drying in two stages: first at a temperature of about 490° F. (about 254° C.) to a moisture content of about 26% by weight and second at a temperature of about 385° F. (about 196° C.) to a moisture content of about 8% or less or about 4% or less, by weight.

In some embodiments, the pulse is a broad bean and the process produces a crispy broad bean. A dry, dehulled or decorticated, raw broad bean is soaked for about 1 hour to about 12 hours, in water at a temperature of about 70° F. (about 21° C.) or less or to a moisture content of about 50% to about 60%, by weight, preferably about 50% to about 55%. The soaked broad bean is cooked in water at about 196° F. to about 204° F. (about 91° C. to about 96° C.) for about 9 minutes to about 35 minutes, or to a moisture content of about 55% to about 65%, by weight, preferably about 55% to about 60%. The hydrated broad bean is then quick-cooled in water at a temperature of about 40° F. to about 50° F. (about 5° C. to about 10° C.) for about 5 minutes. The cooled broad bean is then crisped to a crispy broad bean by drying at a temperature of about 300° F. to about 350° F. (about 149° C. to about 177° C.) for about 20 minutes to about 25 minutes, or to a moisture content of about 4% or less, by weight.

In some embodiments, the broad bean is soaked, quick-cooled, and crisped in the same manner as in the previous paragraph, but the cooking step instead includes cooking in water at about 196° F. to about 204° F. (about 91° C. to about 96° C.), preferably below about 200° F. (about 93° C.), for about 2 minutes to about 5 minutes and then cooking at about 180° F. (about 82° C.) for about 5 minutes to about 25 minutes, such as about 15 minutes to about 25 minutes. These cooking conditions disturb the more delicate internal structure of the dehulled or decorticated broad bean less than the cooking conditions in the previous paragraph.

In some embodiments, the pulse is a yellow whole pea and the process produces a crispy yellow whole pea. A dry, raw yellow whole pea is soaked for about 6 hours to about 12 hours in water at a temperature of about 70° F. (about 21° C.) or less. The soaked yellow whole pea is cooked in water at about 196° F. to about 204° F. (about 91° C. to about 96° C.) for about 45 minutes to about 60 minutes. The hydrated yellow whole pea is then quick-cooled in water at a temperature of about 40° F. to about 50° F. (about 5° C. to about 10° C.) for about 5 minutes. The cooled yellow whole pea is then crisped to a crispy yellow whole pea by drying at a temperature of about 300° F. to about 350° F. (about 149° C. to about 177° C.) for about 15 minutes to about 25 minutes, or to a moisture content of about 4% or less, by weight.

In some embodiments, the process produces a crispy black bean. The dry, raw black bean is soaked in water at a temperature of about 70° F. (about 21° C.) or less for about 6 hours to about 12 hours to a moisture content of about 50% to about 60%, by weight, preferably about 55% to about 58%. The soaked black bean is cooked in water at about 196° F. to about 204° F. (about 91° C. to about 96° C.) for about 60 minutes to about 70 minutes, to a moisture content of about 60% to about 70%, by weight, preferably about 65% to about 70%. The hydrated black bean is then quick-cooled in water at a temperature of about 40° F. to about 50° F. (about 5° C. to about 10° C.) for about 5 minutes. The cooled black bean is then crisped at a temperature of about 265° F. to about 290° F. (about 129° C. to about 143° C.), for about 25 minutes to about 35 minutes to a crispy black bean by drying to a moisture content of about 4% or less, by weight.

In a preferred process, the product has a light and crispy texture while still maintaining the visual integrity of the pulses, for example their original shape and form. In some embodiments, the product has a popped skin appearance but is still recognizable as a complete pulse. In other words, the crispy pulses have a popped shape similar to an overall shape of the raw pulses. A pulse crisping process preferably includes the use of high moisture levels during pressure cooking. This product differs from extruded bean products, which may be crispy but no longer resemble their original form. Additionally, this product is preferably gluten-free and high in vegetable proteins and fiber, with no added sugar.

In some embodiments, the crisping process is shortened, resulting in an expanded product that is shelf-stable but has a higher moisture content than a crispy pulse. Such pulses have a less crispy, more chewy and mealy texture.

In some embodiments, a process of preparing crispy pulses includes cooking raw pulses without first soaking them. In other embodiments, the raw pulses are first soaked in water for a predetermined period of time before cooking. The resulting hydrated pulses have a predetermined texture and a predetermined moisture content. The conditions to reach the hydrated pulse and the predetermined moisture content differ for different pulses. Generally, the predetermined moisture content is in the range of about 50% to about 75% by weight, alternatively about 55% to about 70% by weight, alternatively about 50% to about 55% by weight, alternatively about 55% to about 60% by weight, alternatively about 60% to about 65% by weight. The soaking time may be anywhere from an hour or less up to 15 hours or longer, depending on the type of pulse.

In some embodiments, the raw or soaked pulses and water are placed in a sealable container at a predetermined pulse-to-water ratio, the sealable container is closed, and the pulses are cooked in a pressurizable container at a predetermined pressure for a predetermined period of time. In some embodiments, the raw or soaked pulses and the water are each weighed to assure that the predetermined pulse-to-water ratio is achieved. In some embodiments, the sealable container is a canning jar or a metal can. In other embodiments, the raw or soaked pulses are placed directly in the pressurizable container without being in a sealable container. In some embodiments, the pressurizable container is a pressure cooker.

In some embodiments, additional water is added to the pressurizable container outside the sealable container. The additional water provides the steam temperature and pressure to cook the pulses, but otherwise the amount of additional water beyond what is sufficient to provide the steam pressure may be varied, while still achieving the desired moisture level and texture in the cooked pulse. In some embodiments, the amount of additional water is about 10% to about 20% of the volume of the pressurizable container or alternatively about 15% of the volume of the pressurizable container, although additional water as low as about 7% was successful. The closing of the sealable container prior to cooking may seal the sealable container, but alternatively there may be some exchange and intermixing between steam from the cooking water and steam from the additional water during the cooking process.

Although the cooking process preferably occurs under elevated pressures to reduce the cooking time to reach a predetermined moisture content and texture, the predetermined moisture content and texture may alternatively be reached for some pulses by a cooking process occurring at atmospheric pressure for a longer period of time that is still able to maintain a desired appearance of the pulse. The predetermined moisture content and texture are preferably between a hard pulse and a mushy pulse.

In some embodiments, the pressurizable container is heated over a period of about 15 minutes until the water in the pressurizable container is boiling and the pressure in the pressurizable container reaches a predetermined pressure, which, in some embodiments, is about 10 psig (about 170 kPa), alternatively about 15 psig (about 205 kPa), or alternatively in the range of about 10 to about 15 psig (about 170 kPa to about 205 kPa). The pressurizable container is then held at the predetermined pressure for the predetermined period of time, which, in some embodiments, is in the range of about 2 minutes to about 20 minutes, alternatively in the range of about 2 minutes to about 6 minutes, alternatively in the range of about 2 minutes to about 4 minutes, alternatively in the range of about 4 minutes to about 6 minutes, alternatively in the range of about 10 minutes to about 20 minutes, alternatively about 2 minutes, alternatively about 4 minutes, alternatively about 6 minutes, alternatively about 4 minutes or less, or alternatively about 6 minutes or less. The cooking conditions are preferably selected such that the hydrated pulses reach a predetermined moisture content in the range of about 60% to about 73%, by weight, more preferably in the range of about 65% to about 70%. The predetermined moisture content may differ for different types of pulses. In some embodiments, the heat source is then removed and the pressure is allowed to reduce to atmospheric over a period of about 30 minutes. In some embodiments, the pressurizable container is then opened and the sealable container is removed and allowed to cool over a period of about 45 minutes.

In some embodiments, the amount of additional water in the pressurizable container was selected to be slightly greater than the amount of steam expected to be formed in the pressurizable container under pressure during cooking, and a predetermined pressure of about 15 psig (about 205 kPa) and a predetermined cooking time of about 10 minutes to about 20 minutes were used to achieve the predetermined moisture content and texture. In other embodiments, a twofold-to-threefold amount of additional water was used with a slightly lower predetermined pressure (about 10 psig/about 170 kPa) and a shorter predetermined cooking time (about 2 minutes to about 4 minutes) to achieve the predetermined moisture content and texture. In other embodiments, intermediate amounts of additional water may be used with intermediate values of the predetermined pressure and the predetermined cooking time to achieve the predetermined moisture content and texture.

In some embodiments, the process further includes opening the sealable container, draining the excess liquid from the cooked pulses, and drying the cooked pulses in a convection oven at a predetermined temperature for a predetermined drying period of time. In some embodiments, the cooked pulses are spread out over a perforated baking tray and placed in the convection oven at a low fan speed or alternatively at a high fan speed. In some embodiments, the predetermined temperature is about 275° F. (about 135° C.), alternatively about 225° F. (about 107° C.), or alternatively in the range of about 225° F. to about 275° F. (about 107° C. to about 135° C.), and the predetermined drying period of time is about 30 minutes or more, alternatively about 45 minutes or less, or alternatively in the range of about 30 to about 45 minutes. The crispy pulses are preferably allowed to cool to about 75° F. (about 24° C.) or ambient temperature after being removed from the convection oven.

In other embodiments, the process is a substantially continuous process or at least one portion of the process is continuous. The raw or soaked pulses are preferably placed on a moving platform and enter and pass through a cooking vessel, which may be a pressurizable vessel or other pressurizable container for the predetermined cooking time at the predetermined cooking temperature and pressure. The pulses then enter and pass through an oven at the predetermined drying temperature for the predetermined drying time to produce the crispy pulses.

The process conditions for a crispy pulse are preferably selected such that the moisture content in the crispy pulse after drying or cooling is about 4% by weight or less, alternatively about 3.5% by weight or less, alternatively about 3% by weight or less, alternatively in the range of about 0.5% to about 4% by weight, alternatively in the range of about 3% to about 3.5% by weight, alternatively in the range of about 2.5% to about 3.5% by weight, alternatively in the range of about 0.5% to about 2.5% by weight, or any range or sub-range therebetween, depending on the particular pulse and the further application for the crispy pulse. It will further be appreciated that these moisture contents are exemplary only and that in some embodiments the moisture content of the crispy pulse may be about 4% or greater or about 8% or less by weight. The moisture content may be greater than 4%, if, for example, the end product is used in an application including or requiring higher moisture ingredients. A pulse with a moisture content up to about 8% still has a water activity less than 0.60, which is generally recognized as the point above which microbial growth becomes a concern.

The process conditions are preferably selected such that the density of the crispy pulse relative to the density of the raw pulse is about 70% or less, alternatively about 65% or less, alternatively about 60% or less, alternatively about 53% or less, alternatively in the range of about 30% to about 70%, alternatively in the range of about 38% to about 64%, alternatively in the range of about 40% to about 60%, alternatively in the range of about 47% to about 53%, or any range or sub-range therebetween, depending on the particular pulse and the further application for the crispy pulse. It will further be appreciated that these relative densities ranges are exemplary only and that in some embodiments the relative density of the raw to crispy pulse may be greater or lower.

In some embodiments, the cooling is a quick cooling accomplished by applying a cooling fluid to the pulses. In some embodiments, the cooling fluid is water. In some embodiments, the cooling fluid is air or a similar gas. The quick cooling preferably cools the pulses to a temperature in the range of about 50° F. to about 100° F. (about 10° C. to about 38° C.) in about 5 minutes or less.

The crisping device may be any conventional batch or continuous oven, dryer, or roaster, including, but not limited to, a fluid bed dryer, an impingement oven, a roaster, a toaster, or a convection oven with variable air flow. The crisping device may have variable humidity control.

The cooling device for the dry pulses may be any conventional cooling device known in the industry, including, but not limited to, a fluid bed cooler.

Although the soaking and the cooking may occur in water with no additives, additives may be included during the hydration of the pulses. Additives components may include, but are not limited to, a salt, an acid, a sugar, or a combination thereof. The salt may include, but is not limited to, sodium chloride (NaCl), calcium carbonate ($CaCO_3$), or a combination thereof. The salt may be in the range of about 1% to about 5%, by weight, in the water. The acid may include, but is not limited to, acetic acid, citric acid, malic acid, lactic acid, or a combination thereof. The acid may be in the range of about 1% to about 5%, by weight, in the water. The sugar may be sucrose. The sugar may be in the range of about 1% to about 50%, by weight, in the water. The additive may add flavor to the pulses or manage the porosity of the seed coat of the pulses. For example, the addition of $CaCO_3$ at about 100 parts-per-million (ppm) to about 400 ppm, preferably about 300 ppm, to the soak water strengthens the skin structure of black beans.

In some embodiments, further components are applied during the process to improve the taste or appearance of the crispy pulse product. In some embodiments, the drained cooked pulses are sprayed with a light coat of oil to modify the skin properties of the crispy pulses. In some embodiments, a seasoning is applied to the crispy pulses by tumbling after drying the drained cooked pulses.

The crispy pulses may be provided in a food product either with or without seasoning, loose in a mix with other components such as in a trail mix, alone, or in or part of a larger food product unit such as a chip, a crisp, or a cake similar to a rice cake, which may be made of only crispy pulses or crispy pulses and other components.

In some embodiments, the crispy pulses are lightly coated with an oil, and a flavoring or seasoning is applied to the oiled crispy pulses. In some embodiments, the oil is olive oil or coconut oil. The flavoring or seasoning is preferably applied at a level sufficient to provide a predetermined desired flavor to the crispy pulses. In some embodiments, the flavored or seasoned crispy pulses include about 92% to about 95% crispy pulses, about 1.0% to about 2.5% oil, and about 4.0% to about 5.5% flavoring or seasoning, all by weight.

In other embodiments, after the liquid is drained from the cooked pulses, the cooked pulses are immersed in a seasoning solution for a predetermined seasoning period of time. The immersed pulses are then drained before being placed on a baking tray and dried. The seasoning solution may include, but is not limited to, a salsa solution, a lemon solution, or a garlic solution. The weight ratio of cooked, drained pulses to seasoning solution is preferably about 1:1, alternatively in the range of about 1:2 to about 1:1, alternatively in the range of about 1:1 to about 2:1, or alternatively in the range of about 1:2 to about 2:1. The predetermined seasoning time may be about 15 minutes, alternatively about 30 minutes, alternatively about 45 minutes, or alternatively in the range of about 15 minutes to about 45 minutes.

Alternatively, the cooked pulses may be partially dried before immersing in the seasoning solution. In such embodiments, the partial dry time is preferably about 5 minutes, alternatively about 10 minutes, or alternatively in the range of about 5 minutes to about 10 minutes.

In some embodiments, the crispy pulses are mixed with a low sugar binder solution and optionally or alternatively with one or more additional ingredients to form a snack chip or snack crisp. The low sugar binder may include, but is not limited to, an egg-based protein, a dairy-based protein, a plant-based protein, or combinations thereof. The additional ingredients may include, but are not limited to brown rice, puffed brown rice, white rice, puffed white rice, other grains, chia seeds, other seeds, pieces of dried fruit, pieces of dried vegetable, or combinations thereof. The crispy pulses may be seasoned or unseasoned. The mixture is formed into a predetermined shape and baked at a predetermined temperature for a predetermined time until dry and crispy. The baking may occur in a convection oven at low fan speed, in a baking oven, in a drying oven, or in any other device providing a rate of dehydration or drying that leads to a cohesive product without unfavorable browning occurring. In some embodiments, the mixture includes about 40% to about 50% crispy pulses, about 6% to about 9% binder solution, about 30% to about 40% crisped rice, and about 12% to about 15% seasoning, all by weight. In some embodiments, the predetermined shape is a disc or a thin cylinder. In some embodiments, the predetermined baking temperature is about 275° F. (about 135° C.), alternatively about 225° F. (about 107° C.), or alternatively in the range of about 225° F. to about 275° F. (about 107° C. to about 135° C.), and the predetermined baking period of time is about 30 minutes, alternatively in the range of about 20 minutes to about 40 minutes.

EXAMPLES

The invention is further described in the context of the following examples which are presented by way of illustration, not of limitation.

Example 1

Raw lentils were combined with water at a weight ratio of about 1:1, about 1:2, and about 1:5 to determine the effect of the water on the appearance, taste, and texture of the crispy lentil product. The samples with weight ratios of about 1:1 (Sample 1) and about 1:5 (Sample 5) were cooked for about 2 minutes. Cooking times of about 2 minutes (Sample 2), about 4 minutes (Sample 3), or about 6 minutes (Sample 4) were used with the weight ratio of about 1:2 to determine the effect of cooking time on the appearance, taste, and texture of the crispy lentil product.

The raw lentils and the water were each weighed and placed in a quart canning jar. The jar was closed and placed in a 21-quart (20-L) pressure cooker with about 16 cups (about 3.8 L) of water added to the pressure cooker outside the closed jar. The pressure cooker was heated over a period of about 15 minutes until the water in the pressure cooker was boiling and the pressure in the pressure cooker reached about 10 psig (about 170 kPa). The pressure was held at about 10 psig (about 170 kPa) for the predetermined cooking time. The heat source was then removed and the pressure was allowed to reduce to atmospheric over a period of about 30 minutes. The pressure cooker was then opened and the jars were removed and allowed to cool over a period of about 45 minutes.

The jar was then opened, and the excess liquid was drained from the cooked lentils. The cooked lentils were spread out over a perforated baking tray, and the tray was placed in a convection oven at about 275° F. (about 135° C.) at a low fan speed for about 30 minutes to about 45 minutes to allow the cooked lentils to dry to crispy lentils. The crispy lentils were allowed to cool for about 10 minutes after being removed from the convection oven.

No notable flavor differences or trends were observed between the five samples, but the lentil-to-water ratio and the cooking time both affected the texture of the crispy lentil. The lentil-to-water ratio also affected the appearance of the crispy lentil. Increasing the cooking time from 2 minutes to 4 minutes decreased the crispiness and the crunchiness of the crispy lentil, but a further increase in cooking time to about 6 minutes did not further decrease the crispiness and crunchiness. Decreasing the lentil-to-water ratio from about 1:1 to about 1:2 to about 1:5 increased the moisture absorption and the cohesiveness of the mass of the lentil and decreased the hardness, the crispiness, the crunchiness, the fracturability, and the persistence of crisp and crunch of the crispy lentil. Decreasing the lentil-to-water ratio increased the size but decreased the uniformity of shape of the crispy lentil.

Certain properties of the crispy lentil samples are shown in Table 1. For reference, raw lentils have a density of about 811 g/L. Therefore, the density of the crispy lentil samples was about 61%, about 48%, and about 35% of the density of raw lentils for a 1:1 ratio, a 1:2 ratio, and a 1:5 ratio, respectively. Decreasing the lentil-to-water ratio increased the size and decreased the density of the crispy lentils.

TABLE 1

Crispy Lentil Sample Properties

| Sample | Lentil:Water | Cook Time | Density (g/L) |
|---|---|---|---|
| Sample 1 | 1:1 | 2 min | 493.69 |
| Sample 2 | 1:2 | 2 min | 387.51 |
| Sample 3 | 1:2 | 4 min | 386.34 |
| Sample 4 | 1:2 | 6 min | 388.08 |
| Sample 5 | 1:5 | 2 min | 285.14 |

The crispy lentil samples were further analyzed to determine the nutritional content of the crispy lentils relative to the raw lentils and thereby to determine whether any important nutritional components were lost in the crisping process. The resulting data is shown in Table 2. The data for raw lentils was taken from the US Department of Agriculture (USDA) database.

TABLE 2

Crispy Lentil Sample Nutritional Components

|  | Raw | 1 | 2 | 3 | 4 | 5 |
|---|---|---|---|---|---|---|
| Iron (mg/100 g) | 7.1 | 9.03 | 8.46 | 8.35 | 8.51 | 8.15 |
| Protein (wt. %) | 26.85 | 26.10 | 26.50 | 26.80 | 26.50 | 27.20 |
| Starch (wt. %) | 54.4 | 36.70 | 38.90 | 42.80 | 42.20 | 46.20 |
| Total Dietary Fiber (g/100 g) | 11.7 | 22.8 | 24.4 | 20.3 | 20.2 | 25.7 |
| Vitamin B6 (mg/100 g) | 0.59 | 0.28 | 0.25 | 0.29 | 0.29 | 0.16 |
| Amino Acid Profile (mg/g) | | | | | | |
| Aspartic Acid | 29.7 | 28.90 | 29.50 | 29.20 | 29.10 | 29.50 |
| Threonine | 9.61 | 9.51 | 9.86 | 9.62 | 9.69 | 9.99 |
| Serine | 12.38 | 12.10 | 12.90 | 12.30 | 12.60 | 12.90 |
| Glutamic Acid | 41.63 | 39.80 | 41.30 | 40.40 | 40.50 | 40.90 |
| Proline | 11.22 | 10.10 | 10.40 | 10.20 | 10.20 | 10.80 |
| Glycine | 10.92 | 10.40 | 10.70 | 10.60 | 10.60 | 10.80 |
| Alanine | 11.22 | 10.60 | 11.00 | 10.80 | 10.70 | 11.30 |
| Valine | 13.33 | 12.40 | 12.90 | 12.50 | 12.50 | 13.30 |
| Isoleucine | 11.61 | 11.00 | 11.50 | 11.20 | 11.00 | 11.90 |
| Leucine | 19.47 | 18.60 | 19.60 | 18.90 | 18.80 | 20.20 |
| Tyrosine | 7.17 | 7.46 | 7.40 | 7.29 | 7.08 | 8.00 |
| Phenylalanine | 13.24 | 12.60 | 13.10 | 12.60 | 12.80 | 13.60 |
| Lysine | 18.75 | 16.90 | 17.80 | 17.20 | 17.10 | 18.50 |
| Histidine | 7.55 | 5.87 | 6.06 | 6.01 | 5.87 | 6.20 |
| Arginine | 20.74 | 19.80 | 20.10 | 20.00 | 19.90 | 20.50 |
| Cystine | 3.51 | 1.93 | 1.88 | 1.85 | 1.84 | 1.96 |
| Methionine | 2.29 | 1.98 | 2.14 | 1.94 | 1.99 | 2.34 |
| Total Sugars (wt. %) | 2.21 | 2.1 | 1.7 | 2.2 | 2.3 | 1.0 |

The data in Table 2 show that the relative amounts of most components in the crispy lentils of Samples 1 through 5 were similar to (within about 10% of) those in a raw lentil and that the lentil-to-water ratio and the cook time did not significantly affect the nutritional value for most components, indicating that the nutritional value of a crispy lentil is generally similar to that of a raw lentil. Exceptions to this were the amounts of iron, starch, dietary fiber, vitamin B6, histidine, cystine, and total sugar. Iron content was measured to be about 20% higher in crispy lentils relative to raw lentils, with a decreasing water ratio leading to an increasing iron content. Starch content was measured to be about 25% lower in crispy lentils, with a decreasing water ratio leading to a decreasing starch content. Total dietary fiber content was measured to be about 95% higher in crispy lentils, with a decreasing water ratio leading to a decreasing fiber content. Vitamin B6 content was measured to be more than 50% lower in crispy lentils relative to raw lentils, with a decreasing water ratio leading to an increasing vitamin B6 content. Although the relative amounts of most amino acids were fairly constant, histidine and cysteine were significantly lower in the crispy lentils but otherwise not affected by the water ratio or cook time. Finally, the total amount of sugars was significantly lower at the highest water ratio (Sample 5).

A similar method to the above-described method to prepare crispy lentils was used to prepare crispy chickpeas. Table 3 shows the analytical data results of raw and crispy pulses, which came from the same lot. The numbers in Table 3 are average values of multiple samples. The differences between the raw and crispy pulses in Table 3 may be explained by the concentrations of the solids, similar to Table 2.

TABLE 3

Nutrient Values of Raw and Crispy Chickpeas and Lentils

|  | Raw Chickpeas | Crispy Chickpeas | Raw Lentils | Crispy Lentils |
|---|---|---|---|---|
| Iron (mg/100 g) | 4.63 | 4.42 | 7.75 | 7.57 |
| Protein (wt. %) | 20.40 | 22.20 | 23.40 | 25.35 |
| Total Dietary Fiber (g/100 g) | 28.9 | 33.1 | 34.8 | 23.0 |
| Total Carbohydrates (wt. %) | 63.3 | 66.2 | 63.5 | 67.0 |
| Ash (wt. %) | 3.04 | 1.97 | 2.94 | 2.13 |
| Calories (per 100 g) | 371 | 416 | 358 | 385 |
| Cholesterol (mg/100 g) | <1.0 | <1.0 | <1.0 | <1.0 |
| Total Fat (wt. %) | 4.04 | 6.91 | 1.12 | 1.71 |
| Amino Acid Profile (mg/g) |  |  |  |  |
| Aspartic Acid | 22.50 | 25.75 | 26.40 | 29.15 |
| Threonine | 7.32 | 8.55 | 9.06 | 9.86 |
| Serine | 9.32 | 11.05 | 11.20 | 12.65 |
| Glutamic Acid | 30.60 | 34.05 | 36.40 | 39.85 |
| Proline | 8.19 | 9.61 | 9.26 | 10.45 |
| Glycine | 7.99 | 9.14 | 10.20 | 10.50 |
| Alanine | 8.77 | 10.25 | 10.50 | 11.25 |
| Valine | 9.17 | 10.65 | 11.60 | 12.90 |
| Isoleucine | 8.96 | 10.55 | 10.40 | 11.85 |
| Leucine | 14.60 | 17.30 | 17.20 | 19.65 |
| Tyrosine | 6.12 | 6.77 | 7.34 | 8.03 |
| Phenylalanine | 11.40 | 13.30 | 11.70 | 13.35 |
| Lysine | 13.30 | 14.65 | 15.90 | 17.55 |
| Histidine | 4.82 | 5.35 | 5.35 | 5.78 |
| Arginine | 17.60 | 19.25 | 18.00 | 19.45 |
| Cystine | 2.61 | 2.82 | 2.11 | 2.10 |
| Methionine | 3.03 | 3.43 | 2.05 | 2.26 |
| Total Sugars (wt. %) | 2 | 1 | 0.80 | 0.80 |
| Moisture (wt. %) | 9.2 | 2.8 | 9.0 | 4.7 |

Example 2

About 2 kilograms of dry, raw black beans were soaked in about 6 kg water for about 15 hours. The soaked black beans were placed in a pressure cooker with about 4 kg of water. The pressure cooker was pressurized and held at about 26 psig (about 280 kPa) and about 250° F. (about 121° C.) for about 5 minutes. The pressure was reduced to atmospheric pressure and the pressure cooker was opened. The cooked beans were immediately removed from the pressure cooker and cooled in water for about 60 seconds. The hydrated black beans had an average moisture content of about 70.8% by weight and a firmness in the range of about 252 grams force to about 505 grams force with an average firmness of about 343 grams force.

The black beans were placed at about a ¾-inch bed depth on mesh pasta trays and the trays were run through a continuous impingement oven at about 280° F. (about 138° C.) for about 30 minutes to dry the black beans to a crispy texture.

Example 3

Dry, raw lentils were soaked in water for about 45 minutes. The soaked lentils were then further hydrated by cooking at a temperature in the range of about 203° F. to about 212° F. (about 95° C. to about 100° C.) for about 16 minutes. The resulting hydrated lentils had an average moisture content of about 59% by weight and were subsequently dried to an average moisture content of about 0.69% by weight by placing the hydrated lentils at about a 1.5-in bed depth on mesh pasta trays and exposing the trays to an airflow of about 250 ft/min (about 76 m/min) at about 325° F. (about 163° C.) for about 15 minutes. The resulting lentils had a crispy texture.

Example 4

Soaked chickpeas were continuously processed in a continuous mixer (Mepaco—An Apache Company, Beaver Dam, Wis.), where an auger or screw pushed the pulses through a vessel of water maintained at a temperature in the range of about 194° F. to about 212° F. (about 90° C. to about 100° C.). The continuous mixer raised the moisture content of the chickpeas to about 62% to about 67% by weight by about 36 minutes to about 40 minutes in the continuous mixer, but the desired wet pulse texture was not yet achieved. After about 90 minutes to about 110 minutes, the desired wet pulse texture of starch granules starting to lose their tight-packed alignment and change their shape was reached. The appropriately-cooked pulses were placed on perforated trays and run through a continuous convection oven at about 275° F. (about 135° C.) for about 50 minutes to reach a moisture content of about 3.5% by weight with a crispy texture.

Example 5

A 60-pound batch of dry, raw lentils was soaked for about 45 to about 60 minutes in water at about 70° F. (about 21° C.) or less then heated in water at about 196° F. to about 204° F. (about 91° C. to about 96° C.) for about 24 minutes. The hydrated beans were cooled for about 5 minutes in water at a temperature of about 50° F. to about 70° F. (about 10° C. to about 21° C.) and drained. The texture of the hydrated lentils was in the range of about 5.2 kg to about 11.4 kg force and the bulk density was in the range of about 95 g/L to about 102 g/L. The hydrated lentils were placed at a bed depth of about 1.75 inches and processed at a rate of about 1.02 lb/min through a continuous roaster at a temperature of about 350° F. (about 177° C.), an airflow of about 250 ft/min (about 76 m/min), and a residence time of about 10 minutes. The lentils had a final moisture content of about 3.2% by weight and a crispy texture.

Example 6

About 28 pounds of chickpeas were soaked for about 12 hours water at a temperature of about 50° F. (about 10° C.) or less, to a moisture content of about 52% to about 56% by weight. The soaked chickpeas were then cooked in water at a temperature in the range of about 196° F. to about 204° F. (about 91° C. to about 96° C.) for about 90 minutes, to achieve a hydrated chickpea with a moisture content of about 62% to about 66% by weight. The texture of the hydrated chickpea was measured by a penetrometer (Agrosta Sarl, Serqueux, France) with a target texture measurement of 50% (where 7%=40 g pressure and 100%=806 g). The hydrated chickpeas were cooled for about 5 minutes in water at a temperature of about 50° F. to about 70° F. (about 10° C. to about 21° C.) and drained. The hydrated chickpeas were processed on perforated trays at a rate of 30 lbs/hr through a first stage continuous impingement oven at about 470° F. (about 243° C.) to a moisture content of about 26% by weight and a second stage continuous impingement oven at about 380° F. (about 193° C.) to a final moisture content of about 4.0% to about 6.5% by weight. The chickpeas had a crispy texture.

Example 7

Dry, raw black beans were soaked in water at about 70° F. (about 21° C.) or less for about 8 hours until they reached a moisture content of about 58% by weight. The soaked black beans were then cooked in water at a temperature in the range of about 196° F. to about 204° F. (about 91° C. to about 96° C.) for about 65 minutes under atmospheric pressure until they reached a moisture content in the range of about 64% to about 67% by weight. The hydrated black beans were then placed on perforated trays, which were then dried in a convection oven. For most of the black beans, the center of the black bean popped around the "hinge" of the shell of the bean during drying. The black beans had a final moisture content of about 3.7% by weight and a crispy texture for both the popped and the unpopped black beans. The force of the popping did not significantly move the black beans on the tray and did not cause the black beans to pop off the tray.

Example 8

Dry, raw black beans were soaked in water at about 70° F. (about 21° C.) or less for about 8 hours to a moisture content in the range of about 50% to about 60% by weight. The soaked black beans were cooked in water under atmospheric pressure for about 60 to about 90 minutes to a moisture content of about 64% to about 69% by weight. The hydrated beans were dried in convection oven (AB Electrolux, Stockholm, Sweden) set to about 285° F. (about 141° C.) with about 70% moisture for about 10 minutes, followed by no moisture for about 10 minutes or until dried to a moisture content of about 4% by weight. Some of the dried black beans split slightly but otherwise still retained most of their original shape.

Example 9

Dry, raw chickpeas were soaked in water at about 70° F. (about 21° C.) or less for about 8 hours to about 12 hours, to a moisture content of about 52% to about 56% by weight. The soaked chickpeas were then dried without any further cooking at about 325° F. (about 163° C.) for about 20 minutes to about 25 minutes. Many of the chickpeas broke open or exploded during drying. The chickpeas that did not explode had a hollow center with the starch attached to the shell, had a hard and crunchy texture, and had an uncooked/green taste.

Example 10

Dry, raw chickpeas were soaked in water at about 70° F. (about 21° C.) or less for about 8 hours to about 12 hours, to a moisture content of about 52% to about 56% by weight. The soaked chickpeas were then cooked in water at a temperature in the range of about 196° F. to about 204° F. (about 91° C. to about 96° C.) to a moisture content of about 50% to about 55% by weight. The cooked chickpeas were then dried at about 325° F. (about 163° C.) for about 20 minutes to about 25 minutes. These chickpeas did not break open or explode during drying and did not have an uncooked/green taste, but they did have a hard and crunchy texture and a hollow center with the starch attached to the shell. The cooking conditions were insufficient to produce a crispy chickpea product.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process of producing a plurality of crispy pulses the process comprising:
   hydrating a plurality of raw pulses comprising cooking to produce a plurality of hydrated pulses having a predetermined hydrated texture and a predetermined hydrated moisture content of about 50% to about 75% by weight; and
   crisping the plurality of hydrated pulses at a crisping temperature in the range of about 265° F. to about 490° F. to produce the plurality of crispy pulses having a crispy pulse density less than 70% of a raw pulse density of the plurality of raw pulses, a crispy texture, and a predetermined final moisture content of about 8% or less by weight.

2. The process of claim 1, wherein the hydrating further comprises soaking the plurality of raw pulses to produce a plurality of soaked pulses having a predetermined soaked moisture content and wherein the cooking comprises cooking the plurality of soaked pulses.

3. The process of claim 2, wherein the predetermined soaked moisture content is in the range of about 50% to about 60% by weight.

4. The process of claim 1, wherein the predetermined hydrated moisture content is in the range of about 55% to about 70% by weight.

5. The process of claim 1, wherein the cooking occurs at atmospheric pressure.

6. The process of claim 1, wherein the cooking occurs in a pressure cooker.

7. The process of claim 1 further comprising draining the plurality of hydrated pulses prior to crisping the plurality of hydrated pulses.

8. The process of claim 1 further comprising quick-cooling the plurality of hydrated pulses in a cooling fluid prior to crisping the plurality of hydrated pulses.

9. The process of claim 1, wherein the crisping comprises drying in a crisping device selected from the group consisting of a batch oven, a continuous oven, a dryer, a roaster, a fluid bed dryer, an impingement oven, a toaster, and a convection oven.

10. The process of claim 1, wherein the crisping comprises drying in a crisping device with variable humidity control.

11. The process of claim 1, wherein the crispy pulse density of the plurality of crispy pulses is about 60% or less than of the raw pulse density of the plurality of raw pulses.

12. The process of claim 1, wherein the plurality of raw pulses is selected from the group consisting of a kidney bean, a navy bean, a pinto bean, a lima bean, an azuki bean, a mung bean, a mungo bean, a scarlet runner bean, a rice bean, a moth bean, a Tepary bean, a horse bean, a broad bean, a field bean, a black bean, a yellow whole pea, a garden pea, a chickpea, a cowpea, a pigeon pea, a lentil, an earth pea, a vetch, a lupin, a hyacinth bean, a jack bean, a winged bean, a velvet bean, and a yam bean.

13. The process of claim 1, wherein the hydrating maintains a plurality of starch granules in the plurality of hydrated pulse to still be substantially interconnected while exhibiting swelling and some separation to provide the predetermined hydrated texture.

14. The process of claim 1 further comprising applying a seasoning to the plurality of crispy pulses.

15. The process of claim 1 further comprising forming a snack crisp comprising the plurality of crispy pulses and a binder solution and baking the snack crisp.

16. A process of producing a plurality of crispy pulses the process comprising:
hydrating a plurality of raw pulses to produce a plurality of hydrated pulses having a predetermined hydrated texture and a predetermined hydrated moisture content of about 50% to about 75% by weight; and
crisping the plurality of hydrated pulses at a crisping temperature in the range of about 265° F. to about 490° F. to produce the plurality of crispy pulses having a crispy pulse density less than 70% of a raw pulse density of the plurality of raw pulses, a crispy texture, and a predetermined final moisture content of about 8% or less by weight.

* * * * *